(12) United States Patent
Yoakum

(10) Patent No.: US 10,606,920 B2
(45) Date of Patent: Mar. 31, 2020

(54) EYE CONTROL OF A TEXT STREAM

(71) Applicant: Avaya Inc., Basking Ridge, NJ (US)

(72) Inventor: John H. Yoakum, Cary, NC (US)

(73) Assignee: Avaya Inc., Santa Clara, CA (US)

(*) Notice: Subject to any disclaimer, the term of this patent is extended or adjusted under 35 U.S.C. 154(b) by 565 days.

(21) Appl. No.: 14/471,458

(22) Filed: Aug. 28, 2014

(65) Prior Publication Data

US 2016/0062953 A1   Mar. 3, 2016

(51) Int. Cl.

| G06F 17/21 | (2006.01) |
|---|---|
| G06F 3/01 | (2006.01) |
| G06K 9/00 | (2006.01) |
| G06F 21/32 | (2013.01) |
| H04W 8/18 | (2009.01) |
| G06F 3/0482 | (2013.01) |
| H04N 21/435 | (2011.01) |
| G10L 15/22 | (2006.01) |
| G06F 3/0488 | (2013.01) |
| G06T 19/00 | (2011.01) |
| G06F 17/00 | (2019.01) |

(52) U.S. Cl.
CPC ............ *G06F 17/211* (2013.01); *G06F 3/013* (2013.01); *G06F 3/012* (2013.01); *G06F 3/017* (2013.01); *G06F 3/0482* (2013.01); *G06F 3/04883* (2013.01); *G06F 21/32* (2013.01); *G06K 9/00597* (2013.01); *G06T 19/006* (2013.01); *G10L 15/22* (2013.01); *H04N 21/435* (2013.01); *H04W 8/183* (2013.01)

(58) Field of Classification Search
CPC ...... G06F 17/122; G06F 17/211; G06F 21/32; G06F 3/013; G06F 3/017; G06F 3/0482; G06F 3/04883; G06F 3/0481; G06F 3/012; H04W 8/183; H04N 21/435; G10L 15/22; G06T 19/006
USPC ............. 715/271; 726/19; 382/203, 117–118
See application file for complete search history.

(56) References Cited

U.S. PATENT DOCUMENTS

| 8,160,311 B1 * | 4/2012 | Schaefer ................. G06F 3/011 345/157 |
|---|---|---|
| 2002/0180799 A1 * | 12/2002 | Peck ........................ G06F 3/013 715/784 |

(Continued)

FOREIGN PATENT DOCUMENTS

EP   1646026 A2   12/2006

OTHER PUBLICATIONS

Official Action for United Kingdom Patent Application No. GB1511031.5, dated Aug. 30, 2018 4 pages.

(Continued)

*Primary Examiner* — Quoc A Tran
(74) *Attorney, Agent, or Firm* — Sheridan Ross P.C.

(57) ABSTRACT

Mechanisms for providing text components of a text stream in a display area are disclosed. Text components of a text stream are provided for presentation in a display area of a display. An eye system of a user is concurrently analyzed while providing the text components for presentation in the display area. Based on analyzing the eye system, a stream control command that requests a change in a characteristic of the presentation of the text components is determined. In response to the stream control command, the presentation of the text components is altered in accordance with the stream control command.

17 Claims, 12 Drawing Sheets

(56) References Cited

U.S. PATENT DOCUMENTS

| | | | |
|---|---|---|---|
| 2003/0038754 A1* | 2/2003 | Goldstein | G06F 3/013 345/7 |
| 2006/0066567 A1* | 3/2006 | Scharenbroch | G02B 27/01 345/156 |
| 2011/0205148 A1* | 8/2011 | Corriveau | G09B 5/06 345/156 |
| 2012/0256967 A1 | 10/2012 | Baldwin et al. | |
| 2015/0130716 A1* | 5/2015 | Sridharan | G06F 3/0304 345/158 |
| 2017/0177078 A1* | 6/2017 | Henderek | G06F 3/02 |

OTHER PUBLICATIONS

Official Action for United Kingdom Patent Application No. GB1511031. 5, dated Jan. 8, 2019 2 pages.

Intention to Grant for United Kingdom Patent Application No. GB1511031.5, dated Feb. 18, 2019 2 pages.

Combined Search and Examination Report for British Patent Application No. 1511031.5, dated Dec. 14, 2015, 6 pages.

Johnston, A. et al., "WebRTC: APIs and RTCWEB Protocols of the HTML5 Real-Time Web," Avaya Employee Edition, 1st Edition, Sep. 2012, 81 pages.

\* cited by examiner

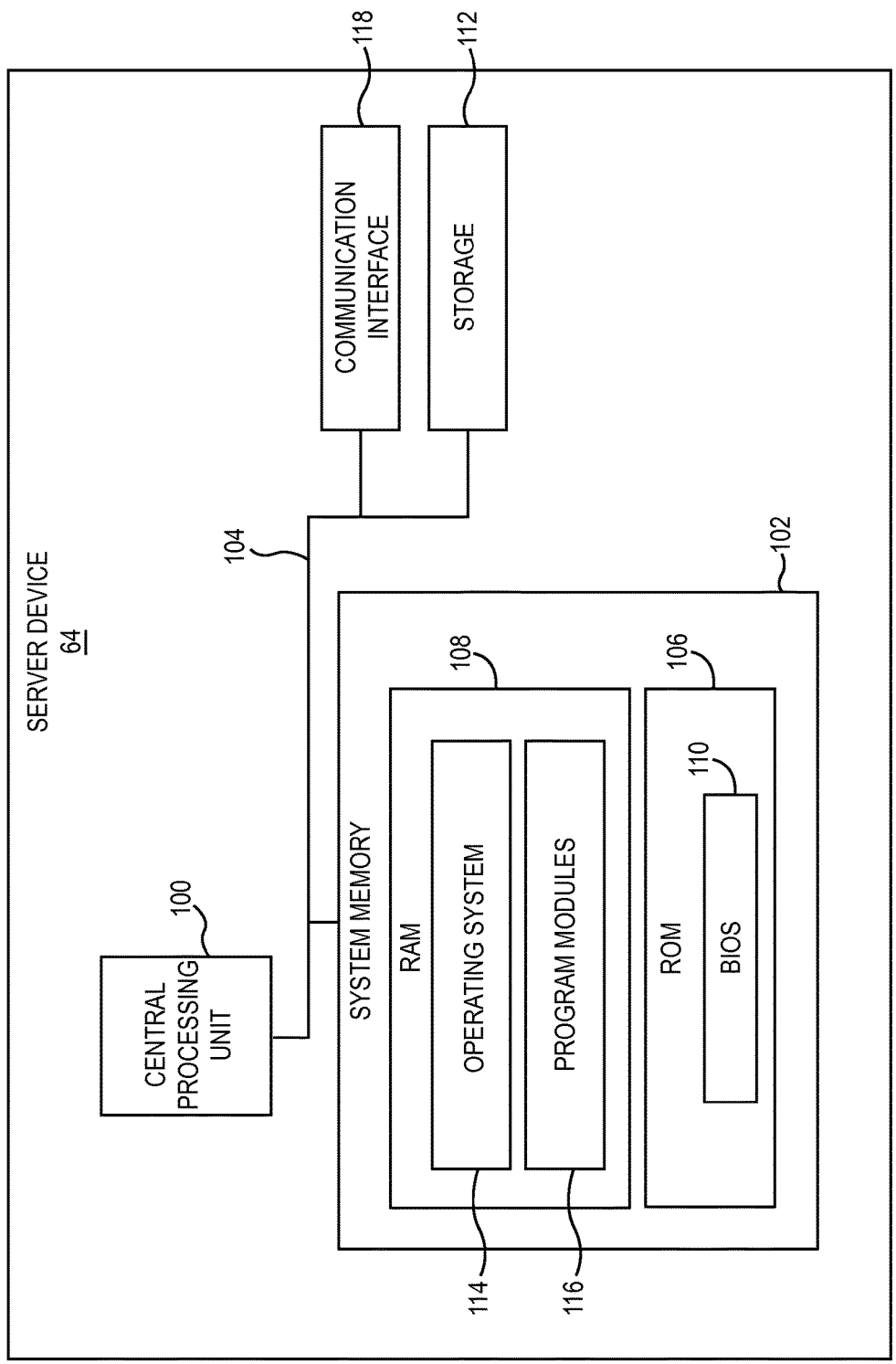

EYE CONTROL OF A TEXT STREAM

TECHNICAL FIELD

The embodiments relate to controlling a text stream, and in particular to eye control mechanisms for controlling a text stream.

BACKGROUND

End-user devices are increasingly designed with a reduced form factor as a primary goal, to reduce weight, bulk, and in many cases, costs. End-user devices that display information, however, have a competing need to provide a display that is legible to a user with average eyesight, limiting how small a display on such a device can be. In some cases, the display becomes a gating factor of the overall size of the device. Wearable devices, such as a watch, that are intended to be worn on a specific part of a human body inherently have very limited space for a display.

In addition to the display, devices often require a mechanism for the user to indicate to the device what information is desired to be viewed. Often one or more physical selection mechanisms, such as buttons, are provided on the device to implement a user interface that facilitates user interaction with the device. Such selection mechanisms must be of a sufficient size that they can be manipulated by a human finger, which again limits the extent to which the device can be reduced in size. This problem can be minimized by implementing only one or two buttons on the device, but this solution requires the user to memorize complex button sequences to initiate different commands. Such user interfaces are often perceived by users as difficult to use, because the complex button sequences are easily forgotten.

Accordingly, it would be desirable to minimize, to the extent practical, the size of a display of a device, and yet still maintain an intuitive user interface for controlling the display of information on the device.

SUMMARY

The embodiments relate to mechanisms for implementing eye control of text streams that are displayed in a display area of a display. The display area may be the complete display, or may be a portion of the display. The embodiments facilitate a relatively small form factor for a display, and also facilitate an intuitive user interface that eliminates the need for relatively large user interface controls.

In one embodiment, a method is provided. Text components of a text stream are provided for presentation in a display area of a display. An eye system of a user is concurrently analyzed while the text components are provided for presentation in the display area. Based on analyzing the eye system, a stream control command that requests a change in a characteristic of the presentation of the text components is determined. In response to the stream control command, the presentation of the text components is altered in accordance with the stream control command.

In one embodiment, the stream control command is a pause stream control command, and the presentation of the text components is altered in accordance with the pause stream control command by pausing the presentation of the text components in the display area.

In one embodiment, the stream control command is an increase pace stream control command, and the presentation of the text components is altered in accordance with the increase pace stream control command by increasing a pace at which the text components are presented in the display area.

In one embodiment, the eye system includes at least one eye of the user, and the stream control command is determined based on analyzing the eye system and determining that the at least one eye has changed a gaze direction from a first gaze direction to a second gaze direction.

In one embodiment, the eye system includes at least one eyelid of the user, and the stream control command is determined based on analyzing the eye system and determining that the at least one eyelid has remained closed for a predetermined period of time.

In one embodiment, the stream control command is determined based on analyzing the eye system and determining that the at least one eyelid has blinked a predetermined number of times within a predetermined period of time.

In one embodiment, the eye system is analyzed by capturing video of the eye system of the user and analyzing the video to detect a movement in the eye system.

In another embodiment, a client and server, or peer-to-peer system, is provided, wherein a server device (or a peer content hosting device) establishes a text channel with a client device over a network. The server also establishes, with the client device, a video channel. The server provides, via the text channel, text components of a first text stream for presentation on the client device. The server receives, from the client device via the video channel, a video stream depicting an eye system of a user associated with the first text stream. Based on an analysis of the video stream, the server determines a stream control command that requests a change in a characteristic of the presentation. In response to the stream control command, the server provides subsequent text components through the text channel in a manner that implements the change in the characteristic of the presentation in accordance with the stream control command.

In another embodiment, a computing device is provided. The computing device includes a camera, a display, and a controller coupled to the camera and the display. The controller is configured to provide text components of a text stream for presentation in a display area of the display. The controller is further configured to analyze an eye system of a user while concurrently providing the text components for presentation in the display area. The controller is further configured to determine, based on analyzing the eye system, a stream control command that requests a change in a characteristic of the presentation of the text components. The controller is further configured to, in response to the stream control command, alter the presentation of the text components in accordance with the stream control command.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 11 is a block diagram of a server device according to one embodiment.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first gaze direction" and "second gaze direction," and does not imply a priority, a type, an importance, or other attribute, unless otherwise stated herein.

The embodiments relate to mechanisms for implementing eye control of text streams that are displayed in a display area of a display. The display area may be the complete display, or may be a portion of the display. The display area may be a portion of a multipurpose display or a specialized text streaming display. The embodiments facilitate a relatively small form factor for a display, and also facilitate an intuitive user interface that eliminates the need for relatively large user interface controls.

Figure 1:
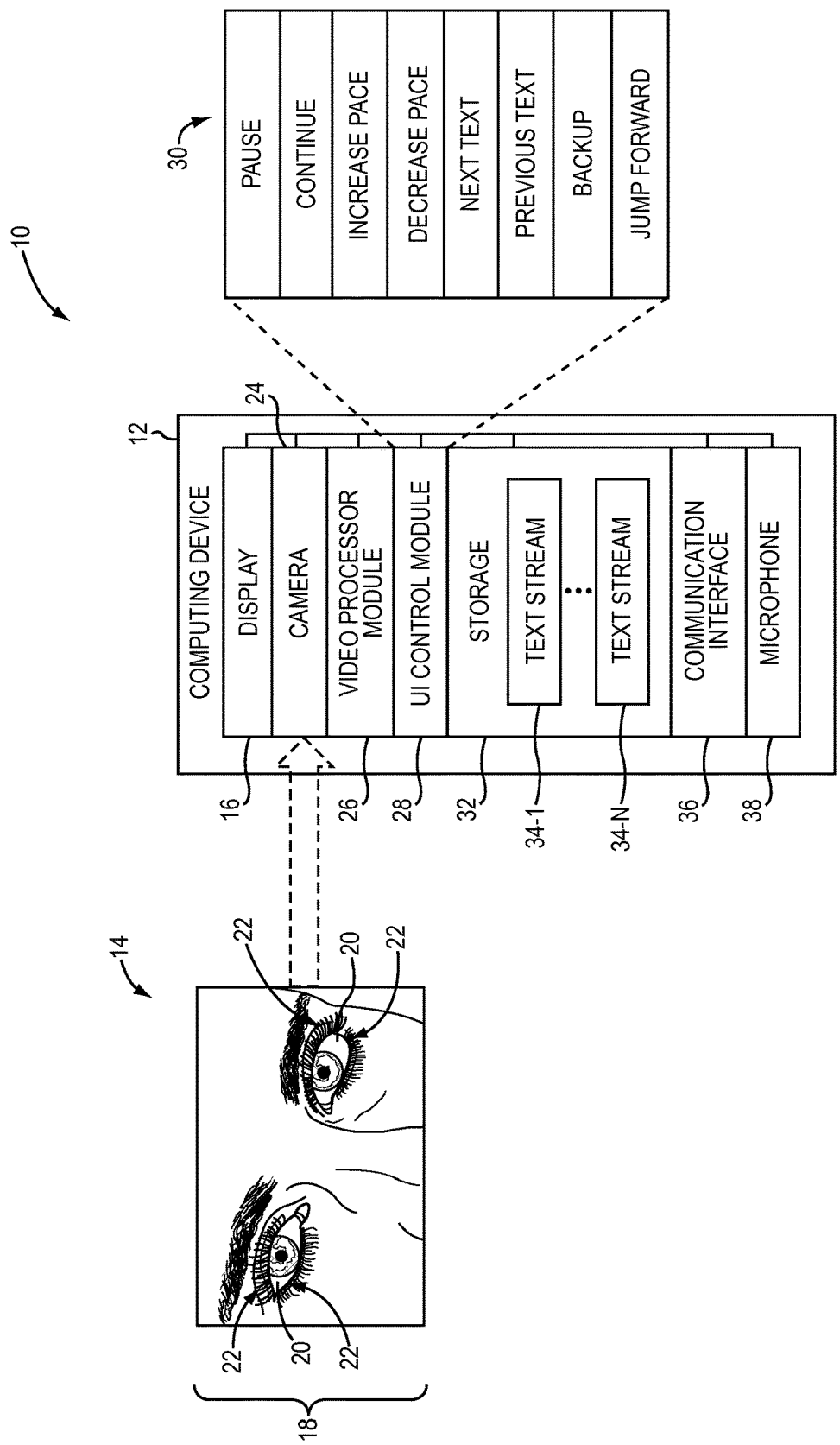
FIG. 1 is a block diagram of a system according to one embodiment.

FIG. 1 is a block diagram of a system 10 according to one embodiment. The system 10 includes a computing device 12. The computing device 12 may offer a user 14 any desired functionality, or functionalities, and may comprise, by way of non-limiting example, a smartphone, a computing tablet, a fitness device, a timekeeping device, a news or information device, or the like. In some embodiments, the computing device 12 may be a wearable device, such as may be worn on a wrist. In some embodiments, the computing device 12 may have a very small form factor that is dictated primarily by the size of a display 16, on which textual information, in the form of a text stream, may be presented to the user 14, and, as discussed in greater detail herein, under the control of an eye system 18 of the user 14. The eye system 18 may include one or two eyes 20, and corresponding eyelids 22.

The computing device 12 includes a viewer-facing camera 24 that can generate video imagery at a framerate, such as 30 or 60 frames per second as non-limiting examples, of a desired scene, including, for example, the eye system 18. A front lens of the camera 24 may be oriented in a direction toward a viewer of the display 16, to facilitate capturing the eye system 18 when the user 14 is viewing the display 16. A video processor module 26 is coupled to the camera 24 and is configured to process the video imagery and identify movements of the eye system 18. Such movements may comprise any desired actions, including, by way of non-limiting example, changing a direction of a gaze of any eye 20, such as right-to-left, or up-to-down, closing of a single eyelid 22 or both eyelids 22 for a predetermined period of time, blinking an eyelid 22 a predetermined number of times within a predetermined period of time, or the like. While several examples have been provided, the embodiments are not limited to any particular movements of the eye system 18, and the video processor module 26 may be configured to detect and identify any desired movement of the eye system 18.

A user interface (UI) control module 28 receives, from the video processor module 26, the identification of a particular eye control movement or action, and translates the eye control action into a text stream control command 30, sometimes referred to herein as a stream control command 30. Stream control commands 30 may comprise, by way of non-limiting example, a pause stream control command, a continue stream control command, an increase pace stream control command, a decrease pace stream control command, a next text stream control command, a previous text stream control command, a backup stream control command, and a jump forward stream control command. It will be appreciated that the stream control commands provided herein are merely examples, and any desired manipulation of text provided on the display 16 may be implemented by the UI control module 28.

In one embodiment, the video processor module 26 may identify to the UI control module 28 a detected eye movement with a predetermined value that is passed or otherwise provided to the UI control module 28. As an example, the UI control module 28 may receive a numeric value of 2 from the video processor module 26, which indicates, for example, that the video processor module 26 detected that an eyelid 22 of the user 14 remained closed for three seconds. The UI control module 28 may translate this eye control movement into a pause stream control command, and thereafter the computing device 12 may immediately pause the current text stream being presented on the display 16.

The computing device 12 may also include a storage 32 that contains one or more text streams 34-1-34-N (generally, text streams 34). Each text stream 34 comprises a collection of related textual components, such as words. In particular, by way of non-limiting example, a text stream 34 may comprise a short message service (SMS) message, an email, a document, a textual file, or the like. The computing device 12 includes a communication interface 36 that facilitates the receipt of additional text streams 34 periodically, or on an ad hoc basis, via a network (not illustrated) using any desired communication technology, such as, by way of non-limiting example, cellular wireless technologies, local area network wireless technologies, such as Wi-Fi®, or other wireless technologies such as Bluetooth®, ZigBee®, or the like. The computing device 12 may alternatively be physically coupled to another computing device by, for example, an Ethernet cable or Universal Serial Bus (USB) cable, and download text streams 34 to the storage 32. The storage 32 may comprise any suitable storage technology, such as flash memory or the like. A microphone 38 may allow the user 14 to also issue audible commands that may be used in lieu of, or in conjunction with, commands issued by the eye system 18.

Figure 2:
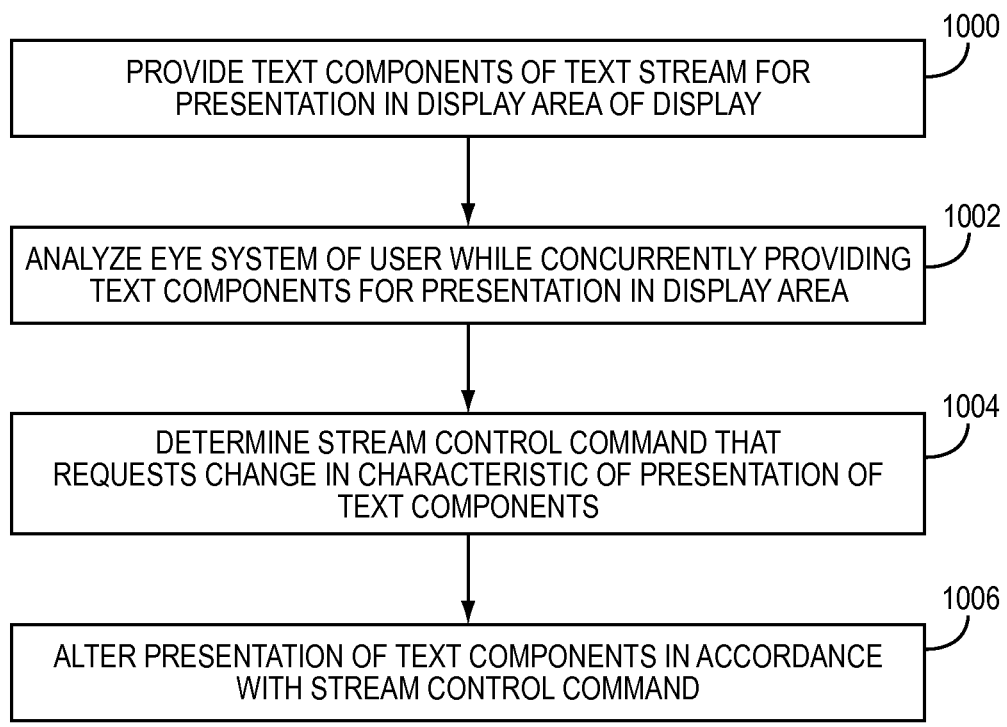
FIG. 2 is a flowchart of a method for providing text components of a text stream in a display area according to one embodiment.

FIG. 2 is a flowchart of a method for providing text components of a text stream in a display area according to one embodiment. FIG. 2 will be discussed in conjunction with FIG. 1. Referring first to FIG. 1, assume that the user 14 has requested that the computing device 12 provide a text stream 34 on the display 16. The request could be initiated via an eye control command implemented via the eye system 18, or via any other mechanism, such as by activating a user input control such as a button (not illustrated) that is located on the computing device 12. The computing device 12 accesses a text stream 34 from the storage 32 and begins providing text components of the text stream for presentation in a display area of the display 16 (FIG. 2, block 1000). The display area may comprise the entire display 16, or may comprise a portion of the display 16. The text components may comprise individual components of the text streams, such as words, or may comprise groups of words, depending on the manner in which it is desired that such components be presented in the display area. In one embodiment, the display area may be capable of only displaying a single word at a time, in which case the text components, in this example words, are displayed successively such that each successive word replaces a previous word in the display area. The embodiments may be utilized in conjunction with streaming technology, such as that available, by way of non-limiting example, by Spritz Technology, Inc., a Delaware corporation having a place of business at 35 Maple Street, Stoneham, Mass. 02180, United States.

In other embodiments, the display area may be larger than a single word, and several words may appear in the display area concurrently. The earlier displayed words may be scrolled off the display area at a predetermined pace as new words are added to the display area. In such embodiments, the text components again comprise individual words. In yet other embodiments where the display area is larger than a single word, multiple words may be concurrently displayed in the display area, and replaced with a new set of multiple words at a particular pace. In such embodiments, the text components may comprise the group, or set, of words that can be concurrently displayed in the display area at one time.

When the user 14 is viewing the display 16, the camera 24 is oriented such that the eye system 18 viewing the display 16 is captured by the camera 24. To facilitate eye control detection in low light conditions, the computing device 12 may include a light source that is not disruptive to the user 14, such as an infrared (IR) light source, to illuminate the eye system 18. The camera 24 may include a sensor that is sensitive to photons in both the visible wavelengths as well as infrared wavelengths, and thus be capable of capturing the eye system 18 under normal lighting conditions, as well as reflections of IR energy in low light conditions.

The video processor module 26 analyzes the eye system 18 of the user 14 concurrently while the text components of the text stream 34 are being provided for presentation in the display area to determine if the eye system 18 has initiated an eye control command (FIG. 2, block 1002). Specifically, the video processor module 26 is configured to detect a change in direction of gaze of one or both eyes 20, and/or movement of the eyelids 22. The video processor module 26 then identifies such eye control movement to the UI control module 28. The UI control module 28 determines a stream control command that requests a change in a characteristic of the presentation of the text components (FIG. 2, block 1004). The change in characteristic can comprise, by way of non-limiting example, pausing the text components, continuing the text components (when previously paused), increasing a pace at which the text components are provided on the display area, decreasing a pace at which the text components are provided on the display area, requesting a next text stream 34, requesting a previous text stream 34, and backing up to an earlier location of the text stream 34. The computing device 12 then alters the presentation of the text components in accordance with the stream control command. In this manner, the computing device 12 facilitates eye control of the text streams 34 in a manner that is intuitive, requires very little physical space of the computing device 12, and does not require physical manipulation by the user 14 of the computing device 12.

Figure 3:
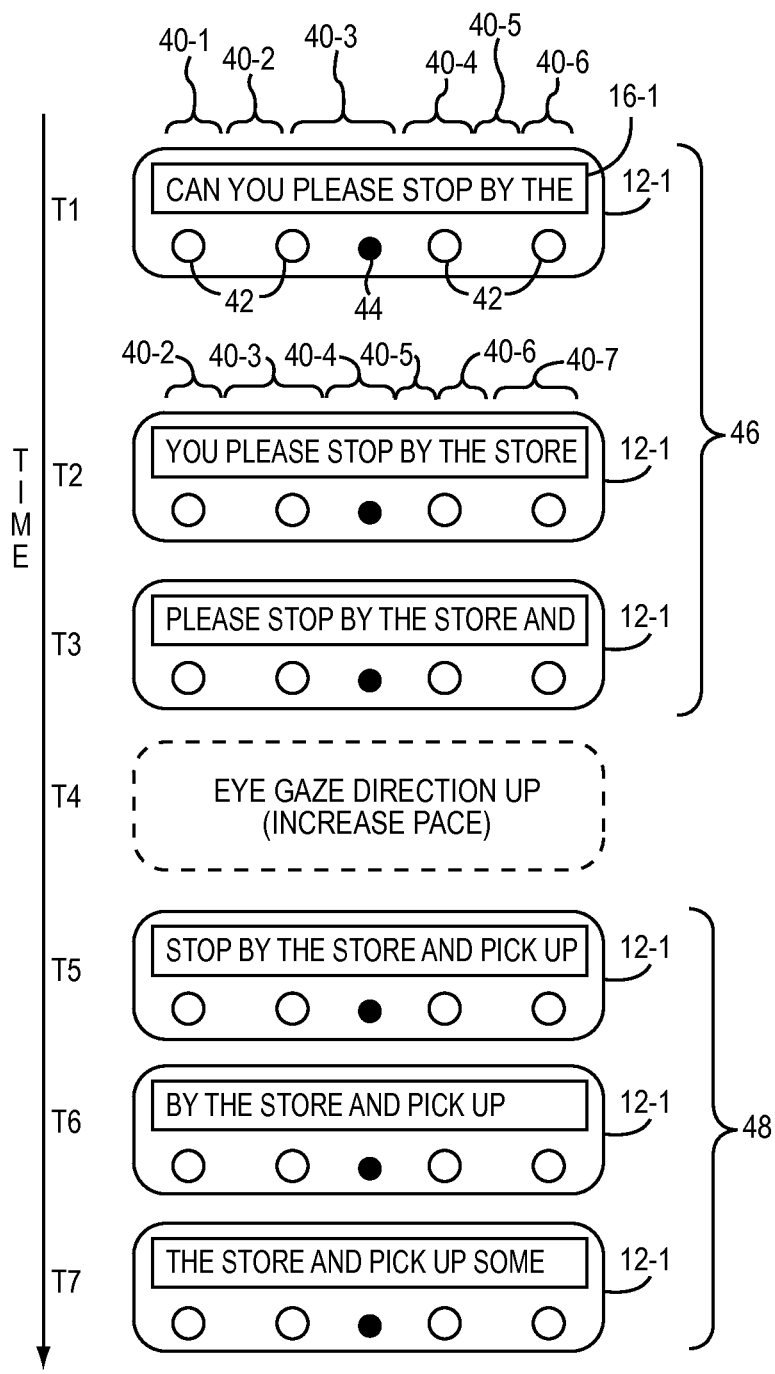
FIG. 3 is a block diagram of a computing device according to one embodiment.

FIG. 3 is a block diagram illustrating a computing device 12-1 at a plurality of successive times according to one embodiment. Except as otherwise stated herein, the computing device 12-1 may be substantially similar to the computing device 12 discussed above. The computing device 12-1 has a display area that comprises an entire display 16-1 and that is capable of concurrently presenting a plurality of text components 40-1-40-6 (generally, text components 40) to the user 14. In one example, the text components 40 comprise words that are scrolled on the display 16-1 such that previously displayed words are removed from the left side of the display 16-1, and new words that are successive in a text stream 34 are added to the right side of the display 16-1. It will be appreciated that the direction that words move across the display 16-1 may differ depending on language and or culture. The computing device 12-1 includes four input controls 42 which may be utilized by the user 14 to interact with the computing device 12-1. The computing device 12-1 also includes a front lens 44 through which the camera 24 can capture the eye system 18 of the user 14 (not illustrated).

At a time T1, the text components 40-1-40-6 are presented on the display 16-1 for the user 14. In this example, the text stream 34 may comprise an email message, and the text components 40-1-40-6 are the first six words of the email message. At a time T2, the text component 40-1 is removed from the display 16-1, the text components 40-2-40-6 are shifted to the left, and a next successive text component 40-7 is added to the rightmost part of the display 16-1. This process repeats at time T3. During a period of time 46 from time T1 through time T3, the text components 40 may be scrolled on the display 16-1 at a first pace. For example, the first pace may comprise 200 words per minute, such that 200 words will be scrolled across the display 16-1 per minute. While the text components 40 are being scrolled across the display 16-1, the video processor module 26 (FIG. 1) is analyzing the eye system 18 of the user 14 by processing the video imagery generated by the camera 24.

At a time T4, the video processor module 26 detects an eye control movement wherein the user 14 moved her gaze in an upward direction. The UI control module 28 interprets this eye control movement as an increase pace stream control command. The computing device 12-1 increases the pace from the first pace to a second, faster pace. The rate at which the pace is increased may be set by the computing device 12-1, or may be configurable by the user 14. Assume that each increase pace stream control command is configured to increase the pace by 30 words per minute. During a period of time 48 that includes times T5, T6, and T7, the computing device 12-1 increases the scrolling pace of the text components 40 such that the text components 40 are scrolled at a pace of 230 words per minute. Each additional upward gaze by the user 14 may increase the pace by an additional 30 words per minute. Similarly, each downward gaze may decrease the pace by 30 words per minute. Thus, the user 14 can easily control the pace at which the text components 40 are presented on the display 16-1 without manually manipulating the computing device 12-1, or otherwise moving her hands.

Figure 4:
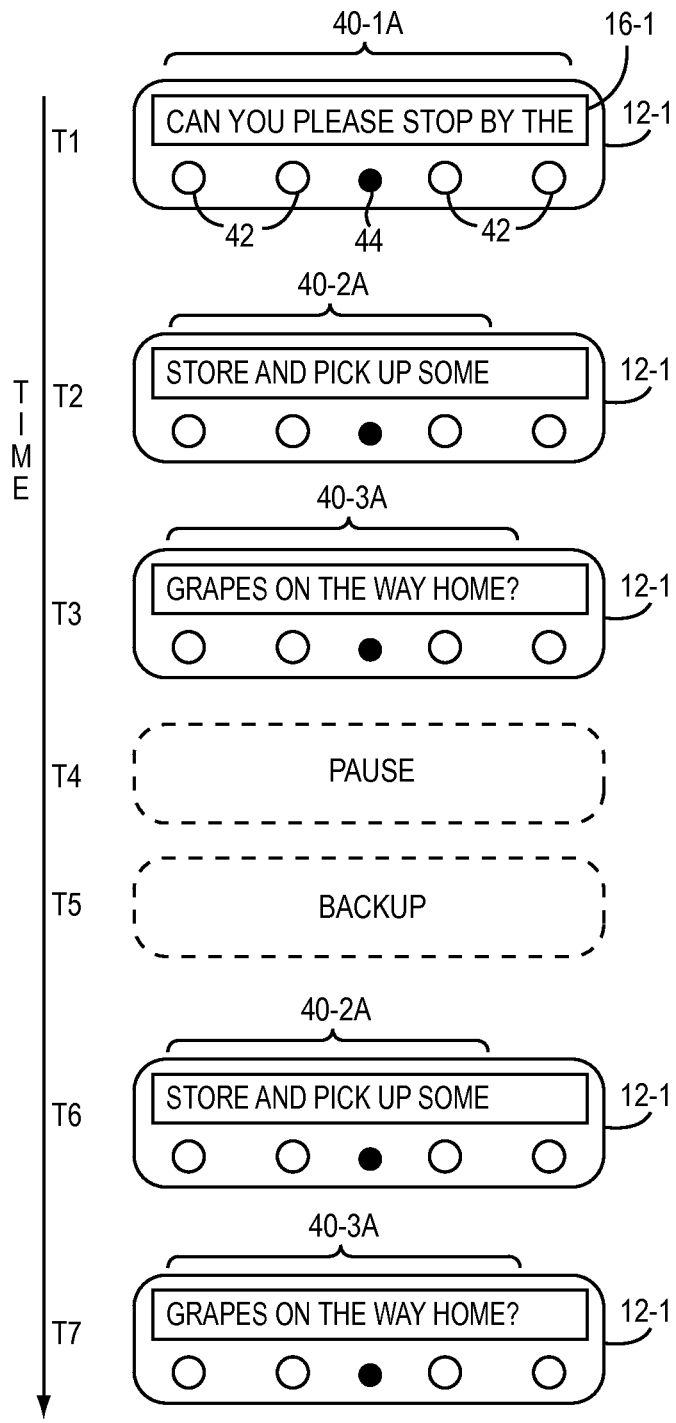
FIG. 4 is a block diagram of a computing device according to another embodiment.

FIG. 4 is a block diagram illustrating the computing device 12-1 at a plurality of successive times, according to another embodiment. In this embodiment, multiple words are concurrently provided for presentation in the display area of the display 16-1. Thus, each text component 40-1A-40-3A comprises a set of words that will fit within the display area of the display 16-1. The text component 40-1A comprises the six words "Can you please stop by the," which are displayed concurrently on the display 16-1 at a time T1. At a time T2, the text component 40-1A is replaced with the text component 40-2A, which comprises the next successive set of words in the respective text stream 34, and which follows the words in the text component 40-1A. This process repeats at T3. The text components 40-1A-40-3A are presented on the display 16-1 at a particular pace, as discussed above with respect to FIG. 3. The pace may be altered in response to an appropriate eye control movement, as discussed above.

At a time T4, the computing device 12-1 determines that the user 14 has performed, via the eye system 18, an eye control movement that translates into a pause stream control command. The eye control movement may comprise, by way of non-limiting for example, keeping an eyelid 22 closed for a predetermined period of time. Alternatively, the eye control movement may comprise, by way of non-limiting for example, blinking an eyelid 22 a predetermined number of times within a predetermined period of time.

In some embodiments, the association of a particular eye control movement, or action, with a particular stream control command may be user configurable. In other embodiments, the association of a particular eye control movement, or action, with a particular stream control command may be system dependent and administrator configurable, or in yet other embodiments, may be unconfigurable.

In response to the eye control movement, the computing device 12-1 stops the presentation of successive text components 40-1A-40-3A (generally, text components 40-A) in the display area of the display 16-1. At a time T5, the computing device 12-1 then determines that the user 14 has performed, via the eye system 18, another eye control movement that translates into a backup stream control command. Again, as discussed above, the eye control movement may comprise any detectable movement of the eye system 18 of the user 14. In response to the backup stream control command, the computing device 12-1 determines a current text component 40-A, in this example the text component 40-3A, that was last provided for presentation in the display area of the display 16-1. The computing device 12-1 then identifies a previous text component 40-A that was previously provided for presentation in the display area. The particular number of previous text components 40-A that are skipped in response to the backup stream control command may be system controlled, or may be configurable by the user 14. In this example, assume that each backup stream control command causes the computing device 12-1 to backup the distance of a single text component 40-A in the respective text stream 34. At a time T6, the computing device 12-1 provides the previous text component 40-2A for presentation in the display area of the display 16-1, and this process continues at a time T7 with the next successive text component 40-3A being presented in the display area of the display 16-1. While, for purposes of illustration, two successive eye control movements have been discussed, a first eye control movement that translates into a pause stream control command and a second eye control movement that translates into a backup stream control command, the user 14 may have issued only the second eye control movement to initiate the backup stream control command. In other words, in some embodiments the stream control commands are independent of one another and do not rely on one stream control command being issued prior to issuance of a different stream control command.

In some embodiments, the computing device 12-1 also implements automatic pause and automatic continue stream control commands in response to certain movements of the eye system 18 of the user 14. For example, an eye control movement wherein the eye system 18 changes its gaze from a first direction that encompasses the display 16-1 to a second direction other than the display 16-1 and does not return to the display 16-1 within a predetermined period of time, may generate an automatic pause stream control command. The predetermined period of time may be relatively short, such as 300-500 milliseconds. In this situation, the computing device 12-1 may pause the presentation of the text components 40-A in the display area of the display 16-1, and, after another predetermined period of time, may automatically dim or turn off the display 16-1. The computing device 12-1 may also record a pause indicator that indicates that the presentation of text components 40-A was automatically paused. The automatic pause stream control command may be beneficial in situations where the user 14 looks away from the display 16-1 after having begun reading a text stream 34 to, for example, address an interruption. Upon detecting that the direction of the gaze of the user 14 has returned to the display 16-1 and that the pause indicator has been set, the computing device 12-1 performs an automatic continue stream control command, and reinitiates the presentation of text components 40-A at the location of the text components 40-A immediately prior to the automatic pause stream control command.

Another example stream control command comprises a next text stream control command. Upon detecting an eye movement of the eye system 18 that translates into a next text stream control command, the computing device 12-1 halts the presentation of the current text stream 34 that is being provided for presentation on the display 16-1. The computing device 12-1 then accesses a next text stream 34 in a list of text streams 34. The next text stream 34 may be determined by any desired criterion or criteria, such as the date the text stream 34 was received, alphabetical order, or the like. The computing device 12-1 then provides text components of the next text stream 34 for presentation in the display area of the display 16-1.

Another example stream control command comprises a previous text stream control command. Upon detecting an eye movement of the eye system 18 that translates into a previous text stream control command, the computing device 12-1 halts the presentation of the current text stream 34 that is being provided for presentation on the display 16-1. The computing device 12-1 then accesses a previous text stream 34 in the list of text streams 34. The computing device 12-1 then provides text components of the previous text stream 34 for presentation in the display area of the display 16-1.

Figure 5:
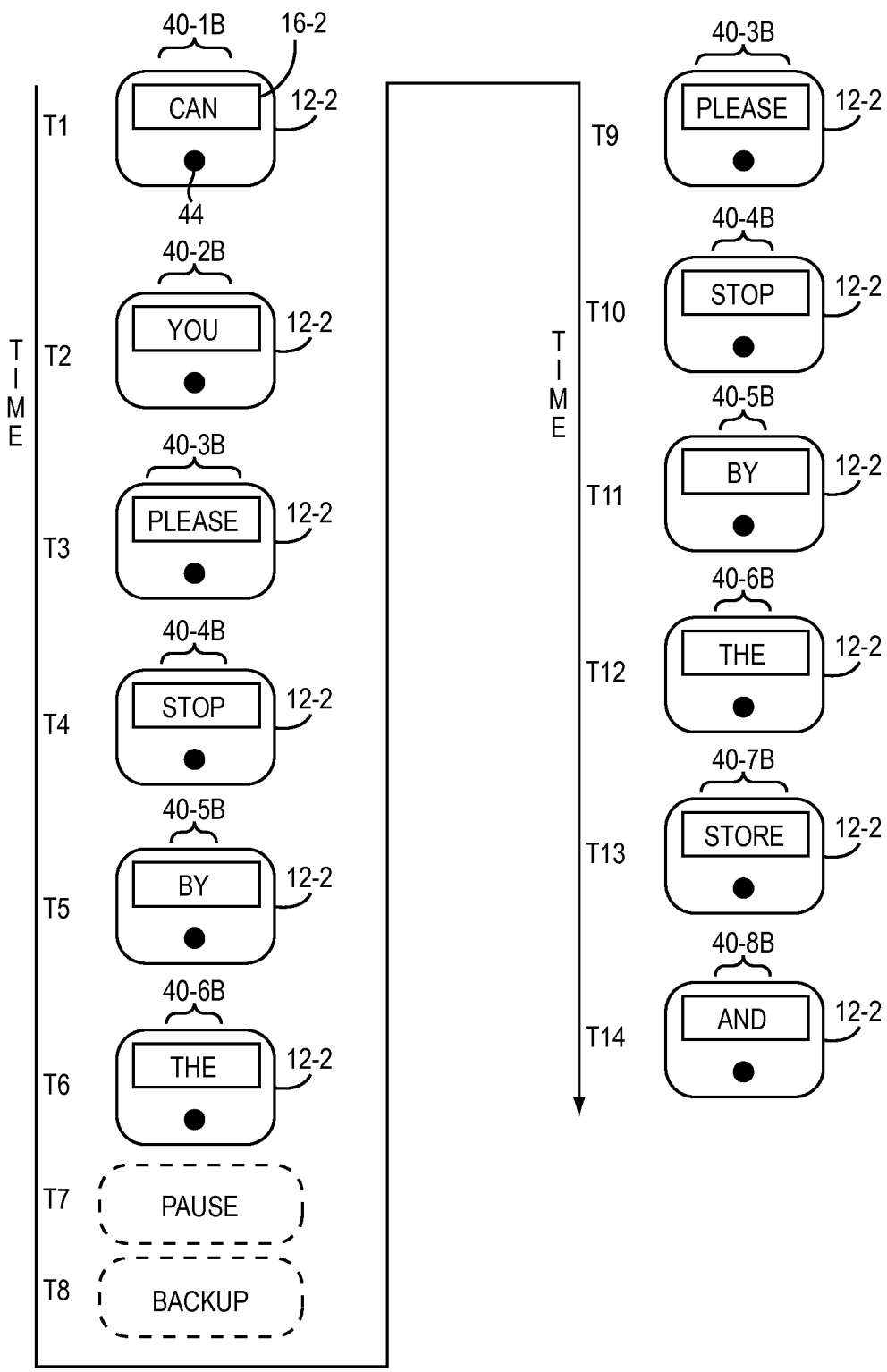
FIG. 5 is a block diagram of a computing device according to another embodiment.

FIG. 5 is a block diagram of a computing device 12-2 according to another embodiment. Except as otherwise stated herein, the computing device 12-2 may be substantially similar to the computing device 12 discussed above. The computing device 12-2 comprises a relatively small display 16-2, and the front lens 44 through which the eye system 18 of the user 14 may be captured by the camera 24 (not illustrated). The computing device 12-2 provides for presentation on the display 16-2 a single word at a time, and thus the computing device 12-2 may have a very small form factor. Each text component 40-1B-40-8B (generally, text components 40-B) comprises a single word. The text components 40-B may be provided for presentation on the display 16-2 at a particular pace, which, as discussed above, may be altered in response to appropriate eye control movements.

The computing device 12-2 provides text components 40-1B-40-6B for presentation on the display 16-2 at successive times T1-T6. At a time T7, the computing device 12-2 detects an eye movement that translates into a pause stream control command. The computing device 12-2 halts the presentation of text components 40-B in the display area of the display 16-2. At a time T8, the computing device 12-2 then determines that the user 14 has performed, via the eye system 18, another eye control movement that translates into a backup stream control command. As discussed above, the eye control movement may comprise any detectable movement of the eye system 18 of the user 14. In response to the backup stream control command, the computing device 12-2 determines a current text component 40-B (in this example the text component 40-6B) that was last provided for presentation in the display area of the display 16-2. The computing device 12-2 then identifies a previous text component 40-B that was previously provided for presentation in the display area. The particular number of previous text components 40-B that are skipped in response to the backup stream control command may be system controlled, or may be configurable by the user 14. In this example, assume that each backup stream control command causes the computing device 12-2 to backup the distance of three text components 40-B in the respective text stream 34. At a time T9, the computing device 12-2 provides the previous text component 40-3B for presentation in the display area of the display 16-2, and this process continues at a time T10 with the next successive text component 40-4B being presented in the display area of the display 16-2. At times T11-T14, the computing device 12-2 successively provides text components 40-5B-40-8B for presentation on the display 16-2.

Figure 6:
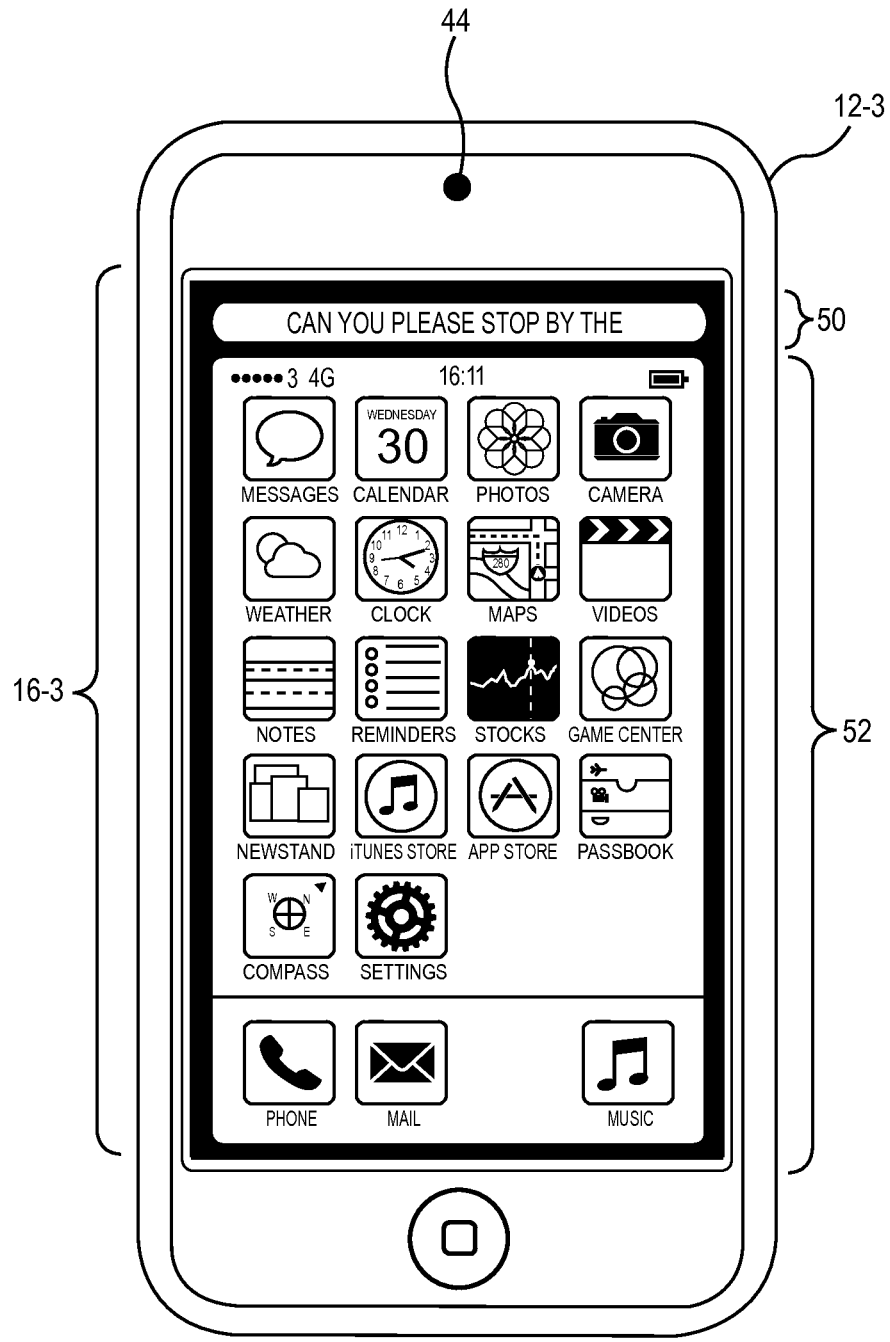
FIG. 6 is a block diagram of a computing device according to another embodiment.

FIG. 6 is a block diagram of a computing device 12-3 according to another embodiment. Except as otherwise stated herein, the computing device 12-3 may be substantially similar to the computing device 12 discussed above. In this embodiment, the computing device 12-3 comprises a smartphone. The computing device 12-3 comprises a relatively large display 16-3 and the front lens 44 through which the eye system 18 of the user 14 may be captured by the camera 24 (not illustrated). The display 16-3 includes a display area 50 in which a text stream 34 may be presented, and a display area 52 in which other functionality may be provided concurrently with the presentation of a text stream 34.

Figure 7:
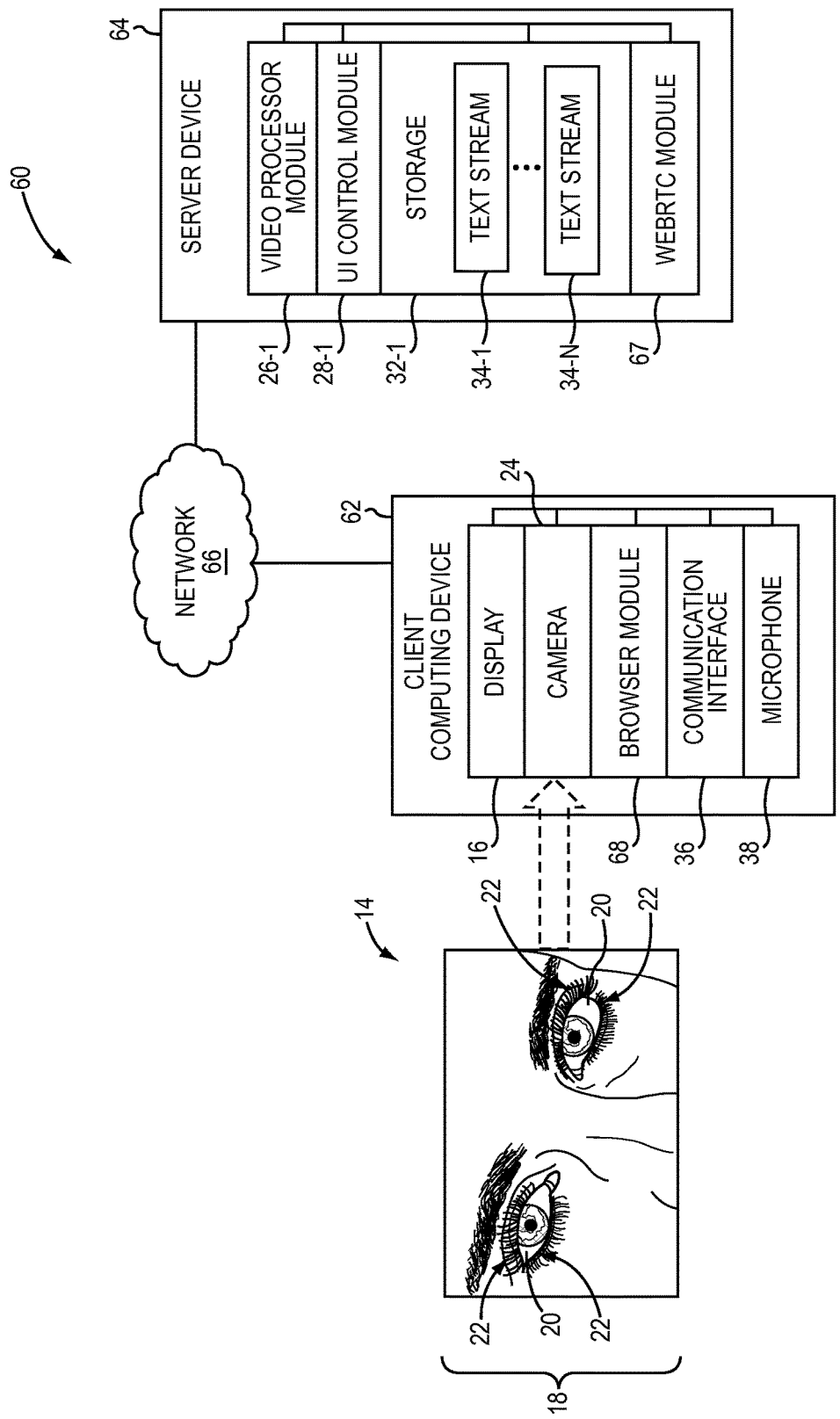
FIG. 7 is a block diagram of a system according to another embodiment.

FIG. 7 is a block diagram of a system 60 according to another embodiment. In this embodiment a client computing device 62 has the display 16, camera 24, communication interface 36, and microphone 38, which provide functionality substantially similar to that described above with regard to FIG. 1. However, in this embodiment, some of the functionality described above is provided by a server device 64 that is in communication with the client computing device 62 via a network 66. The network 66 may comprise any suitable communication technology, or combination of technologies, such as cellular, local wireless, and the like, that facilitate communication between the client computing device 62 and the server device 64. In this embodiment, a video processor module 26-1 on the server device 64 analyzes video imagery of the eye system 18 of the user 14 that is provided to the server device 64 by the client computing device 62. The video processor module 26-1 operates substantially similarly to the video processor module 26 described above with regard to FIG. 1, except as otherwise stated herein.

A UI control module 28-1 receives, from the video processor module 26-1, the identification of a particular eye control movement or action, and translates the eye control action into a stream control command 30. A storage 32-1 comprises one or more text streams 34-1-34-N.

In one embodiment, the server device 64 communicates with the client computing device 62 via a Web Real-Time Communication (WebRTC) protocol. WebRTC is an application programming interface definition drafted by the World Wide Web Consortium (W3C) that supports browser-to-browser applications for text, voice, and video streams, without plugins. The server device 64 may implement the WebRTC protocol via a WebRTC module 67 that communicates with a browser module 68 that executes on the client computing device 62. However, the communications discussed herein between the client computing device 62 and the server device 64 may be implemented using any desired protocol or suite of protocols, and the embodiments are not limited to the use of WebRTC.

Figure 8:
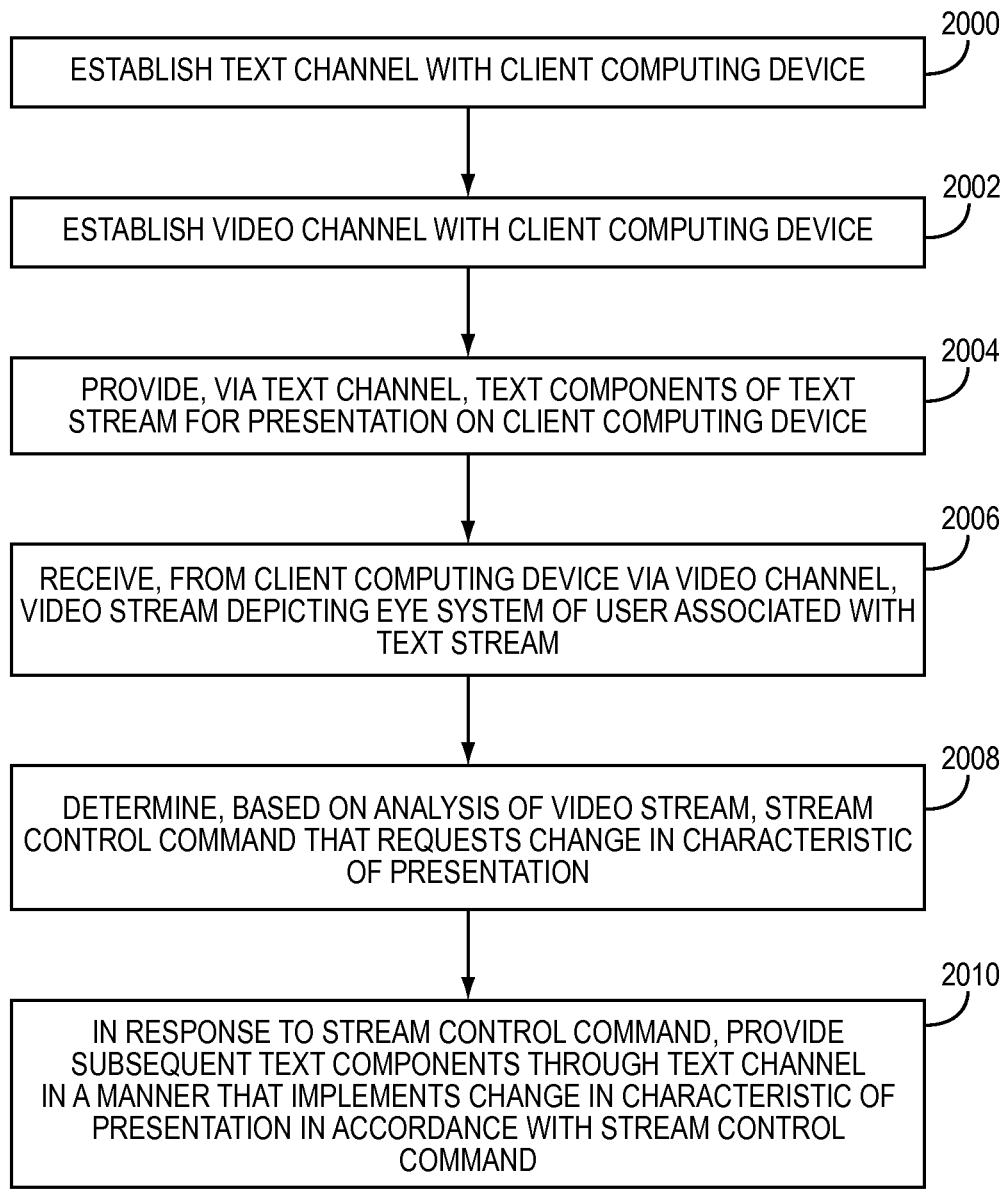
FIG. 8 is a flowchart of a method for providing a text stream from a server device to a client computing device according to one embodiment.

FIG. 8 is a flowchart of a method for providing a text stream from the server device 64 to the client computing device 62 according to one embodiment. FIG. 8 will be discussed in conjunction with FIG. 7. Initially, the server device 64 establishes a text channel between the server device 64 and the client computing device 62 (FIG. 8, block 2000). The server device 64 also establishes a video channel between the server device 64 and the client computing device 62 (FIG. 8, block 2002). As discussed above, the establishment of the text channel and video channel may be accomplished, in some embodiments, by appropriate WebRTC commands and/or messages. The server device 64 provides the text components of a text stream 34 via the text channel to the client computing device 62 for presentation on the display 16

(FIG. 8, block 2004). Substantially concurrently therewith, the client computing device 62 begins providing a video stream via the video channel to the server device 64 that depicts the eye system 18 of the user 14 (FIG. 8, block 2006). The client computing device 62 provides the text components of the text stream 34 for presentation on the display 16. The server device 64 determines, based on an analysis of the video stream, a stream control command that requests a change in a characteristic in the presentation of the text components on the display 16 (FIG. 8, block 2008). As discussed above, the determination of the stream control command is based on a detection, by the video processor module 26-1, of an eye movement of the eye system 18 that is depicted in the video stream received from the client computing device 62.

The requested change in characteristic can comprise any suitable stream control command, including, as discussed above, a pause stream control command, a continue stream control command, an increase pace stream control command, a decrease pace stream control command, a next text stream control command, a previous text stream control command, a backup stream control command, and a jump forward stream control command.

In response to the stream control command, the server device 64 provides subsequent text components to the client computing device 62 via the text channel in a manner that implements the requested change in characteristic in accordance with the stream control command (FIG. 8, block 2010). For example, if the stream control command comprises a pause stream control command, the server device 64 may halt providing text components to the client computing device 62. If the stream control command comprises a continue stream control command, the server device 64 may continue providing successive text components to the client computing device 62. If the stream control command comprises a backup stream control command, the server device 64 may backup a predetermined number of text components, and provide such text components, and successive text components, to the client computing device 62. If the stream control command comprises a jump forward stream control command, the server device 64 may move forward a predetermined number of text components, and provide such text components, and successive text components, to the client computing device 62. If the stream control command comprises an increase pace stream control command, the server device 64 may increase a pace at which the server device 64 provides text components to the client computing device 62. If the stream control command comprises a next text stream control command, the server device 64 may halt providing a current text stream 34 to the client computing device 62 and begin providing a next text stream 34 to the client computing device 62.

Figure 9A:
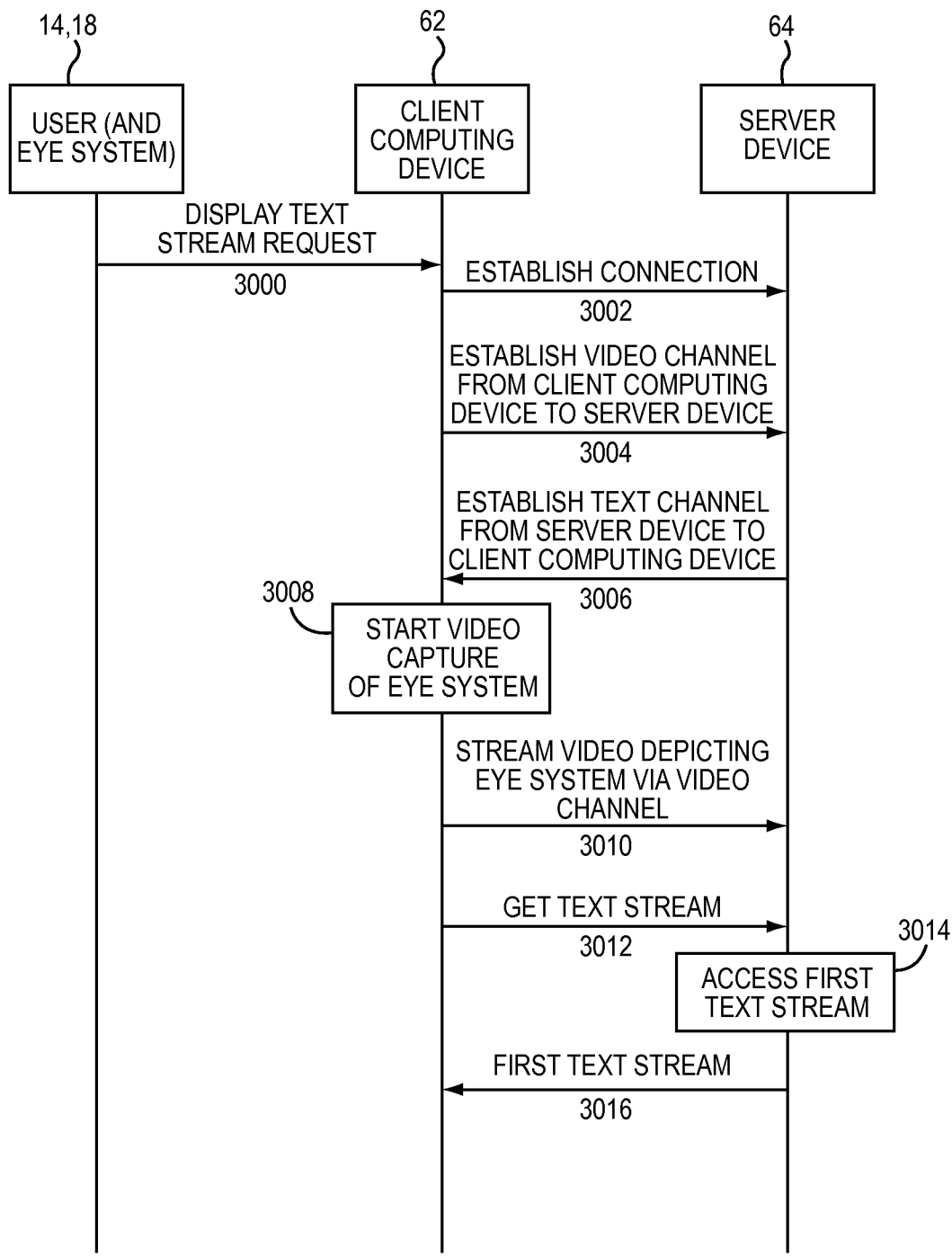
FIGS. 9A-9B are message flow diagrams that illustrate an example message flow between a client computing device and a server device according to one embodiment.
Figure 9B:
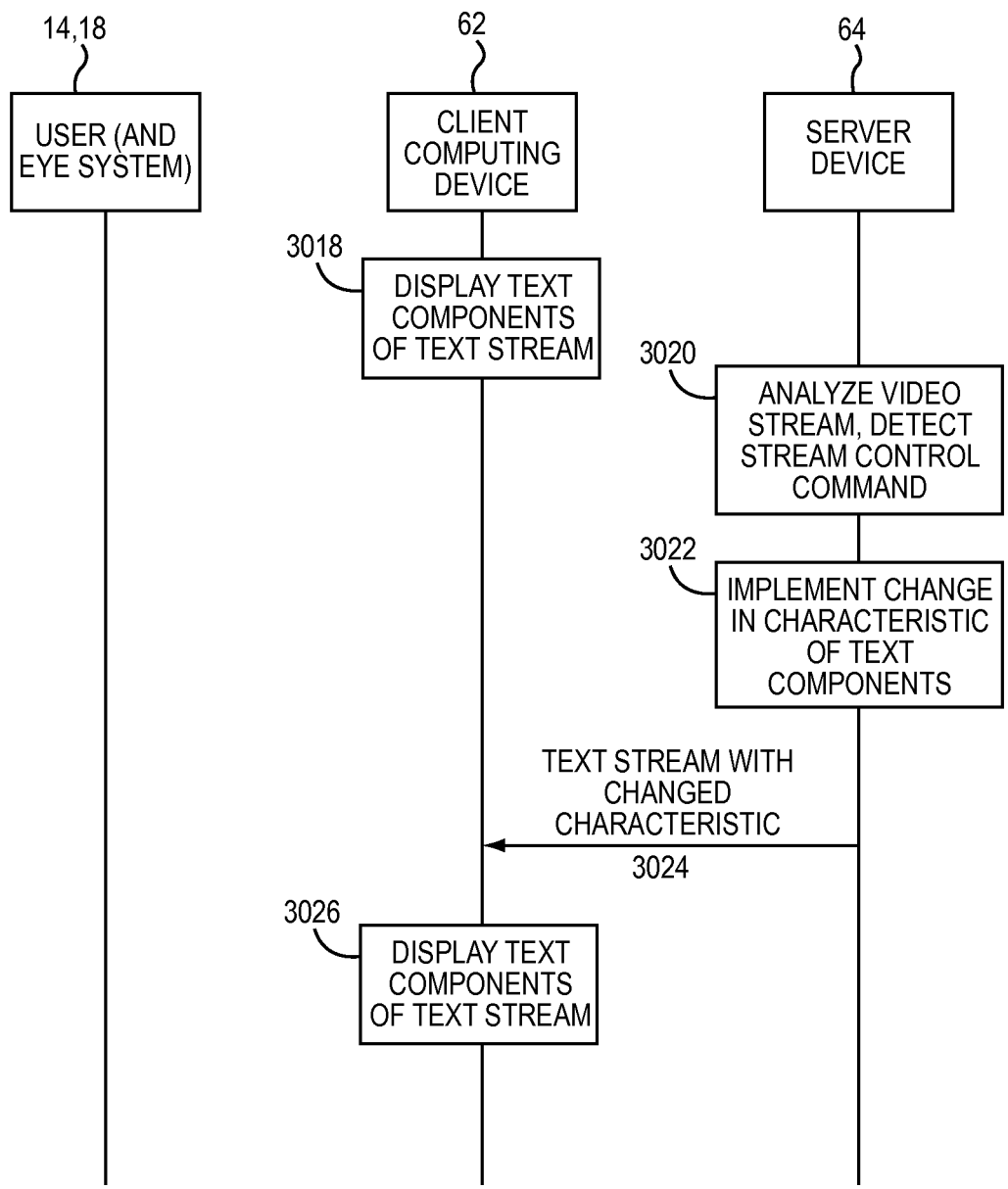

FIGS. 9A-9B are message flow diagrams that illustrate an example message flow between the client computing device 62 and the server device 64 according to one embodiment. While for purposes of illustration the embodiments discussed with regard to FIGS. 9A-9B are discussed in the context of a client-server system, those of skill in the art will recognize the applicability of such embodiments to other multiple device architectures, such as, by way of non-limiting example, a peer-to-peer system, or a peer content hosting system. Initially, the client computing device 62 may receive a request for a text stream 34 from the user 14 (step 3000). In response, the client computing device 62 establishes a connection with the server device 64 (step 3002). The client computing device 62 and the server device 64 establish a text channel and a video channel (steps 3004-3006). The client computing device 62 begins to capture and generate video imagery of the eye system 18 of the user 14 (step 3008). The client computing device 62 streams the video imagery to the server device 64 via the established video channel (step 3010). The client computing device 62 requests a text stream 34 from the server device 64 (step 3012). The server device accesses a first text stream 34 and provides the first text stream 34 to the client computing device 62 via the established text channel (steps 3014-3016).

The client computing device 62 provides text components of the first text stream 34 on the display 16 on an ongoing basis as the client computing device 62 receives the text components from the server device 64 (step 3018). Concurrently therewith, the server device 64 analyzes the video imagery of the eye system 18 received from the client computing device 62 on an ongoing basis (step 3020). Assume that, at some point in time, the server device 64 determines that the user 14 has issued a stream control command via the eye system 18 (step 3020). The server device 64 than implements a change in a characteristic of the text components being provided to the client computing device 62 (step 3022). As discussed previously, the change in characteristic can comprise any desired change, such as pace, the location within the text stream 34, or the selection of different text streams 34, for example. The server device 64 then provides the text stream 34 with the change in characteristic to the client computing device 62 (step 3024). The client computing device 62 provides the text components for presentation to the user 14 on the display 16.

While for purposes of illustration certain functionality has been illustrated in FIGS. 9A-9B as being implemented in the server device 64 and other functionality implemented in the client computing device 62, it will be appreciated that the precise division of functionality between the server device 64 and the client computing device 62 could be system dependent and that other divisions of functionality between such devices may be implemented. For example, in another embodiment, the video processor module 26 and the UI control module 28 may be implemented in the client computing device 62, while certain text stream processing may be implemented in the server device 64. The client computing device 62 may detect and identify a particular stream control command that requests a change in a characteristic of the presentation of the text components, and communicate the occurrence of the particular stream control command to the server device 64. The server device 64 may then provide subsequent text components to the client computing device 62 via the text channel in a manner that implements the requested change in characteristic in accordance with the stream control command.

Figure 10:
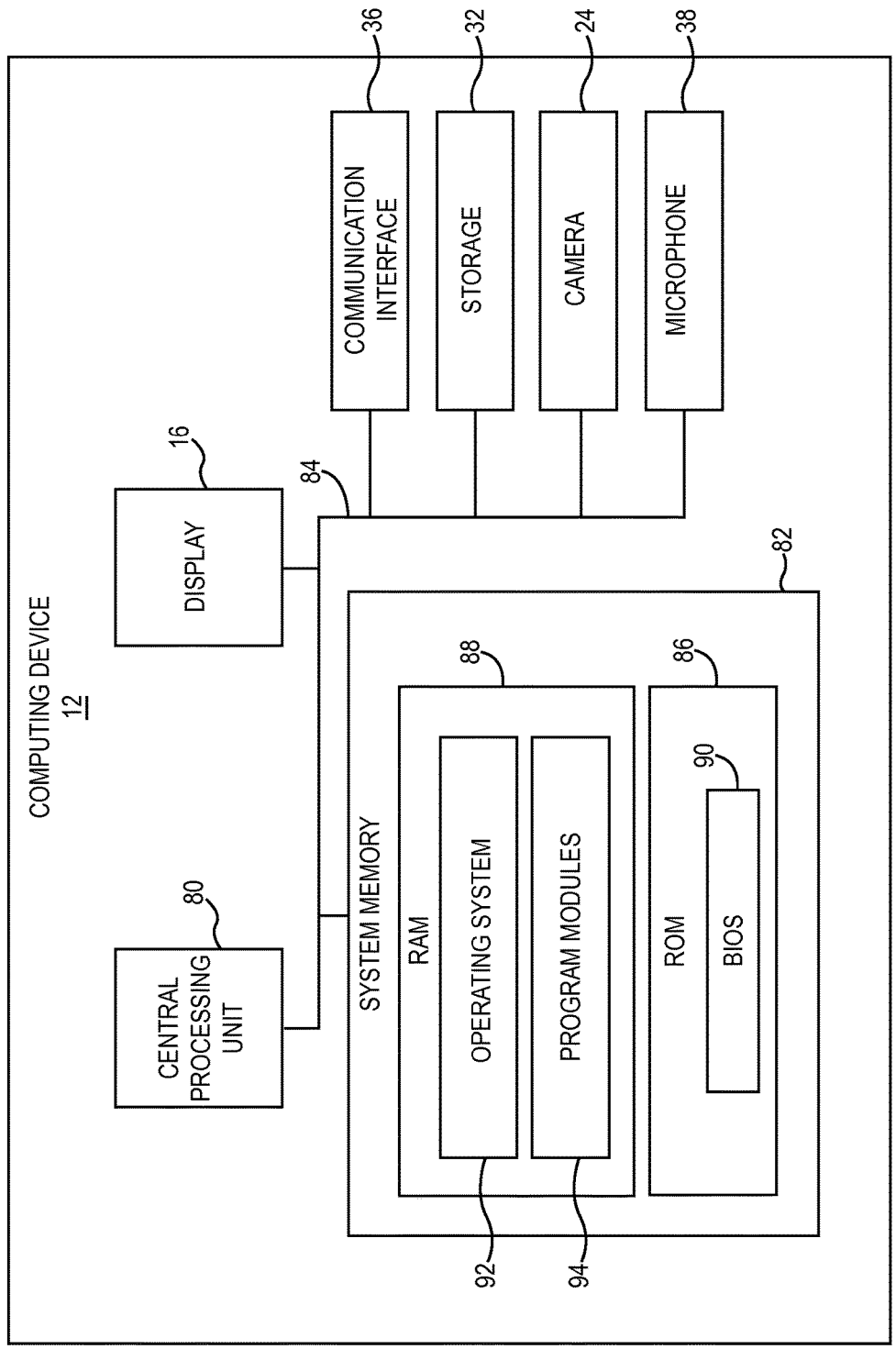
FIG. 10 is a block diagram of a client device illustrated in FIG. 1 according to one embodiment.

FIG. 10 is a block diagram of the computing device 12 according to one embodiment. The computing device 12 may comprise any computing or processing device capable of including firmware, hardware, and/or executing software instructions to implement the functionality described herein, such as a smartphone, a computing tablet, a fitness device, a timekeeping device, a news or information device, or the like. The computing device 12 includes a central processing unit 80, a system memory 82, and a system bus 84. The system bus 84 provides an interface for system components including, but not limited to, the system memory 82 and the central processing unit 80. The central processing unit 80 can be any commercially available or proprietary processor.

The system bus 84 may be any of several types of bus structures that may further interconnect to a memory bus (with or without a memory controller), a peripheral bus, and/or a local bus using any of a variety of commercially available bus architectures. The system memory 82 may include non-volatile memory 86 (e.g., read only memory (ROM), erasable programmable read only memory (EPROM), electrically erasable programmable read only memory (EEPROM), etc.) and/or volatile memory 88 (e.g., random access memory (RAM)). A basic input/output system (BIOS) 90 may be stored in the non-volatile memory 86, and can include the basic routines that help to transfer information between elements within the computing device 12. The volatile memory 88 may also include a high-speed RAM, such as static RAM for caching data.

The computing device 12 may further include or be coupled to the storage 32, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 32 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory, solid-state memory, cartridges, and the like, may also be used, and further, that any such media may contain computer-executable instructions for performing novel methods of the disclosed embodiments.

A number of modules can be stored in the computer-readable storage 32 and in the volatile memory 88, including an operating system 92 and one or more program modules 94, which may implement the functionality described herein in whole or in part, including, for example, functionality associated with the video processor module 26 and UI control module 28.

All or a portion of the embodiments may be implemented as a computer program product stored on a transitory or non-transitory computer-usable or computer-readable storage medium, such as the computer-readable storage 32, which includes complex programming instructions, such as complex computer-readable program code, configured to cause the central processing unit 80 to carry out the steps described herein. Thus, the computer-readable program code can comprise software instructions for implementing the functionality of the embodiments described herein when executed on the central processing unit 80. The central processing unit 80, in conjunction with the program modules 94 in the volatile memory 88, may serve as a controller for the computing device 12 that is configured to, or adapted to, implement the functionality described herein. The computing device 12 also includes the communication interface 36, camera 24, display 16, and optionally, the microphone 38. The client computing device 62 may include similar components as those discussed herein with regard to the computing device 12.

FIG. 11 is a block diagram of the server device 64 according to one embodiment. The server device 64 may comprise any computing or processing device capable of including firmware, hardware, and/or executing software instructions to implement the functionality described herein, such as a work station, desktop computer, telecommunications switch, server, laptop computer, or the like. The server device 64 includes a central processing unit 100, a system memory 102, and a system bus 104. The system bus 104 provides an interface for system components including, but not limited to, the system memory 102 and the central processing unit 100. The central processing unit 100 can be any commercially available or proprietary processor.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory 106 (e.g., read only memory (ROM), erasable programmable read only memory (EPROM), electrically erasable programmable read only memory (EEPROM), etc.) and/or volatile memory 108 (e.g., random access memory (RAM)). A basic input/output system (BIOS) 110 may be stored in the non-volatile memory 106, and can include the basic routines that help to transfer information between elements within the server device 64. The volatile memory 108 may also include a high-speed RAM, such as static RAM for caching data.

The server device 64 may further include or be coupled to a storage 112, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 112 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory, solid-state memory, cartridges, and the like, may also be used, and further, that any such media may contain computer-executable instructions for performing novel methods of the disclosed embodiments.

A number of modules can be stored in the computer-readable storage 112 and in the volatile memory 108, including an operating system 114 and one or more program modules 116, which may implement the functionality described herein in whole or in part, including, for example functionality associated with the video processor module 26-1, UI control module 28-1, and WebRTC module 67.

All or a portion of the embodiments may be implemented as a computer program product stored on a transitory or non-transitory computer-usable or computer-readable storage medium, such as the computer-readable storage 112, which includes complex programming instructions, such as complex computer-readable program code, configured to cause the central processing unit 100 to carry out the steps described herein. Thus, the computer-readable program code can comprise software instructions for implementing the functionality of the embodiments described herein when executed on the central processing unit 100. The central processing unit 100, in conjunction with the program modules 116 in the volatile memory 108, may serve as a controller for the server device 64 that is configured to, or adapted to, implement the functionality described herein. The server device 64 also includes a communication interface 118 for communicating with the client computing device 62 and other computing devices, as appropriate, via the network 66.

Those skilled in the art will recognize improvements and modifications to the preferred embodiments of the disclosure. All such improvements and modifications are considered within the scope of the concepts disclosed herein and the claims that follow.

What is claimed is:

1. A method for providing text components of a text stream in a display area, comprising:
  analyzing, by a computing device comprising a processor, an eye system of a user while concurrently providing a navigational menu that lists a plurality of items for viewing, wherein each item in the navigational menu comprises one of a text message, an email message, or a document;
  determining, based on analyzing the eye system, a selection of one of the items in the navigational menu;
  providing, by the computing device, the text components of the text stream associated with the selected item for presentation in the display area of a display, wherein the text components are presented in the display area such that at least one previously presented text components are scrolled off the display area as successive text components are added to the display area;

analyzing, by the computing device, the eye system of the user while concurrently providing the text components of the text stream for presentation in the display area;

determining, based on analyzing the eye system, a stream control command of a plurality of stream control commands that requests a change in a characteristic of the presentation of the text components; and in response to the stream control command, altering the presentation of the text components in accordance with the stream control command.

2. The method of claim 1, wherein the stream control command comprises a backup stream control command, and wherein altering the presentation of the text components in accordance with the backup stream control command comprises:

determining a current text component provided for presentation in the display area;

identifying a previous text component previously provided for presentation in the display area; and providing the previous text component and consecutive text components of the text stream for presentation in the display area.

3. The method of claim 1, wherein the stream control command comprises a jump forward stream control command, and wherein altering the presentation of the text components in accordance with the jump forward stream control command comprises:

determining a current text component provided for presentation in the display area;

identifying a successive text component in the text stream; and providing the successive text component and consecutive text components of the text stream for presentation in the display area.

4. The method of claim 1, wherein the eye system comprises at least one eyelid of the user, and wherein determining the stream control command based on analyzing the eye system comprises determining that the at least one eyelid has remained closed for a predetermined period of time.

5. The method of claim 1, wherein the eye system comprises at least one eyelid of the user, and wherein determining the stream control command based on analyzing the eye system comprises determining that the at least one eyelid has blinked a predetermined number of times within a predetermined period of time.

6. The method of claim 1, wherein analyzing the eye system of the user while concurrently providing the text components of the text stream for presentation in the display area comprises:

capturing video of the eye system of the user; and analyzing the video to detect a movement in the eye system.

7. The method of claim 1, wherein the plurality of stream control commands further comprise an increase pace stream control command and wherein altering the presentation of the text components in accordance with the increase pace stream control command comprises increasing a pace at which the text components are scrolled off the display area and successive text components are added to the display area in response to detecting movement of a gaze of the eye system from the text components in a first direction to a first area within the display area above the text components and back to the text components.

8. The method of claim 1, wherein the plurality of stream control commands further comprise a decrease pace stream control command and wherein altering the presentation of the text components in accordance with the decrease pace stream control command comprises decreasing a pace at which the text components are scrolled off the display area and successive text components are added to the display area in response to detecting movement of a gaze of the eye system from the text components in a second direction to a second area within the display area below the text components and back to the text components.

9. The method of claim 1, wherein the plurality of stream control commands comprise a pause stream control command, a next text stream control command, and a previous text stream control command, wherein altering the presentation of the text components in accordance with the pause stream control command comprises pausing the scrolling text components off the display area and adding of successive text components to the display area, wherein altering the presentation of the text components in accordance with the next text stream control command comprises halting the presentation of the text stream and providing text components of a next text stream in the list of text streams for presentation in the display area, and wherein altering the presentation of the text components in accordance with the previous text stream control command comprises halting the presentation of the text stream and providing text components of a previous text stream in the list of text streams for presentation in the display area.

10. A system comprising:

a processor; and a memory coupled with and readable by the processor and storing therein a set of instructions which, when executed by the processor, causes the processor to provide text components of a text stream in a display area by:

analyzing an eye system of a user while concurrently providing a navigational menu that lists a plurality of items for viewing, wherein each item in the navigational menu comprises one of a text message, an email message, or a document;

determining, based on analyzing the eye system, a selection of one of the items in the navigational menu;

providing the text components of the text stream associated with the selected item for presentation in the display area of a display, wherein the text components are presented in the display area such that at least some previously presented text components are scrolled off the display area as successive text components are added to the display area;

analyzing the eye system of the user while concurrently providing the text components of the text stream for presentation in the display area;

determining, based on analyzing the eye system, a stream control command of a plurality of stream control commands that requests a change in a characteristic of the presentation of the text components; and in response to the stream control command, altering the presentation of the text components in accordance with the stream control command.

11. The system of claim 10, wherein the plurality of stream control commands further comprise an increase pace stream control command and wherein altering the presentation of the text components in accordance with the increase pace stream control command comprises increasing a pace at which the text components are scrolled off the display area and successive text components are added to the display area in response to detecting movement of a gaze of the eye system from the text components in a first direction to a first area within the display area above the text components and back to the text components.

12. The system of claim 10, wherein the plurality of stream control commands further comprise a decrease pace stream control command and wherein altering the presentation of the text components in accordance with the decrease pace stream control command comprises decreasing a pace at which the text components are scrolled off the display area and successive text components are added to the display area in response to detecting movement of a gaze of the eye system from the text components in a second direction to a second area within the display area below the text components and back to the text components.

13. The system of claim 10, wherein the plurality of stream control commands comprise a pause stream control command, a next text stream control command, and a previous text stream control command, wherein altering the presentation of the text components in accordance with the pause stream control command comprises pausing the scrolling text components off the display area and adding of successive text components to the display area, wherein altering the presentation of the text components in accordance with the next text stream control command comprises halting the presentation of the text stream and providing text components of a next text stream in the list of text streams for presentation in the display area, and wherein altering the presentation of the text components in accordance with the previous text stream control command comprises halting the presentation of the text stream and providing text components of a previous text stream in the list of text streams for presentation in the display area.

14. A non-transitory computer-readable medium comprising a set of instructions stored therein which, when executed by a processor, causes the processor to provide text components of a text stream in a display area by:
  analyzing an eye system of a user while concurrently providing a navigational menu that lists a plurality of items for viewing, wherein each item in the navigational menu comprises one of a text message, an email message, or a document;
  determining, based on analyzing the eye system, a selection of one of the items in the navigational menu;
  providing the text components of the text stream associated with the selected item for presentation in the display area of a display, wherein the text components are presented in the display area such that at least one previously presented text components are scrolled off the display area as successive text components are added to the display area;
  analyzing the eye system of the user while concurrently providing the text components of the text stream for presentation in the display area;
  determining, based on analyzing the eye system, a stream control command of a plurality of stream control commands that requests a change in a characteristic of the presentation of the text components; and
  in response to the stream control command, altering the presentation of the text components in accordance with the stream control command.

15. The non-transitory computer-readable medium of claim 14, wherein the plurality of stream control commands further comprise an increase pace stream control command and wherein altering the presentation of the text components in accordance with the increase pace stream control command comprises increasing a pace at which the text components are scrolled off the display area and successive text components are added to the display area in response to detecting movement of a gaze of the eye system from the text components in a first direction to a first area within the display area above the text components and back to the text components.

16. The non-transitory computer-readable medium of claim 14, wherein the plurality of stream control commands further comprise a decrease pace stream control command and wherein altering the presentation of the text components in accordance with the decrease pace stream control command comprises decreasing a pace at which the text components are scrolled off the display area and successive text components are added to the display area in response to detecting movement of a gaze of the eye system from the text components in a second direction to a second area within the display area below the text components and back to the text components.

17. The non-transitory computer-readable medium of claim 14, wherein the plurality of stream control commands comprise a pause stream control command, a next text stream control command, and a previous text stream control command, wherein altering the presentation of the text components in accordance with the pause stream control command comprises pausing the scrolling text components off the display area and adding of successive text components to the display area, wherein altering the presentation of the text components in accordance with the next text stream control command comprises halting the presentation of the text stream and providing text components of a next text stream in the list of text streams for presentation in the display area, and wherein altering the presentation of the text components in accordance with the previous text stream control command comprises halting the presentation of the text stream and providing text components of a previous text stream in the list of text streams for presentation in the display area.

* * * * *

UNITED STATES PATENT AND TRADEMARK OFFICE
CERTIFICATE OF CORRECTION

PATENT NO.        : 10,606,920 B2
APPLICATION NO.   : 14/471458
DATED             : March 31, 2020
INVENTOR(S)       : John H. Yoakum Page 1 of 1

It is certified that error appears in the above-identified patent and that said Letters Patent is hereby corrected as shown below:

In the Claims

At Column 14, Line 65, Claim 1 delete "one" and insert --some-- therein.

At Column 17, Line 47, Claim 14 delete "one" and insert --some-- therein.

Signed and Sealed this
Twenty-fifth Day of August, 2020

Andrei Iancu
*Director of the United States Patent and Trademark Office*